United States Patent [19]

Skapura et al.

[11] Patent Number: 5,204,938
[45] Date of Patent: Apr. 20, 1993

[54] METHOD OF IMPLEMENTING A NEURAL NETOWRK ON A DIGITAL COMPUTER

[75] Inventors: David M. Skapura; Gary J. McIntire, both of Friendswood, Tex.

[73] Assignee: Loral Aerospace Corp., New York, N.Y.

[21] Appl. No.: 853,105

[22] Filed: Mar. 18, 1992

Related U.S. Application Data

[62] Division of Ser. No. 359,066, May 30, 1989.

[51] Int. Cl.[5] .................... G06F 15/600; G06F 15/18
[52] U.S. Cl. ........................................ 395/27; 395/11
[58] Field of Search ...................... 395/27, 11, 24, 27

[56] References Cited

U.S. PATENT DOCUMENTS

| | | | |
|---|---|---|---|
| 4,414,624 | 11/1983 | Summer, Jr. et al. | 364/200 |
| 4,858,147 | 8/1989 | Conwell | 364/513 |
| 4,974,169 | 11/1990 | Engel | 364/513 |
| 5,038,282 | 8/1991 | Gilbert et al. | 364/200 |

OTHER PUBLICATIONS

Myers et al., "Application of New Artificial Neural System Information Processing Principles to Pattern Classification", Rept. No. ARO-22323.2-MA, 1987.
Deer et al., "Parallel Processor for the Simulation of Adaptive Networks", IEEE 1988 National Aerospace and Electronics Conf., May 1988, 1574-1580.
Frazier, G., "Ariel: A Scalable Multiprocessor for the Simulation of Neural Networks", Computer Architecture News, vol. 18(1), Mar. 1990, 107-114.
Kuczewski et al., "Neurocomputer Workstations and Processors: Approaches and Applications", Proc. IEEE First Intl. Conf. on Neural Networks, Jun. 1987, III 487-500.
Hecht-Nielsen, R., Neurocomputing, Addison-Wesley Pub., 1990, pp. 305-315.

Primary Examiner—Michael R. Fleming
Assistant Examiner—Robert W. Downs
Attorney, Agent, or Firm—Edward J. Radlo; Elizabeth F. Enayati

[57] ABSTRACT

A digital computer architecture specifically tailored for implementing a neural network. Several simultaneously operable processors (10) each have their own local memory (17) for storing weight and connectivity information corresponding to nodes of the neural network whose output values will be calculated by said processor (10). A global memory (55,56) is coupled to each of the processors (10) via a common data bus (30). Output values corresponding to a first layer of the neural network are broadcast from the global memory (55,56) into each of the processors (10). The processors (10) calculate output values for a set of nodes of the next higher-ordered layer of the neural network. Said newly-calculated output values are broadcast from each processor (10) to the global memory (55,56) and to all the other processors (10), which use the output values as a head start in calculating a new set of output values corresponding to the next layer of the neural network.

2 Claims, 4 Drawing Sheets

METHOD OF IMPLEMENTING A NEURAL NETOWRK ON A DIGITAL COMPUTER

This is a divisional application of application Ser. No. 359,066, filed May 30, 1989.

TECHNICAL FIELD

This invention pertains to the field of using a digital computer having several simultaneously operated processors optimized to implement a neural network. In general terms, a neural network is a process which is intended to emulate the functioning of the human brain by means of looking at problems as a whole and engaging in self-training.

BACKGROUND ART

Many important pattern classification problems remain unsolved. This category of problems includes automatic target recognition, sonar signature classification, automated fault diagnosis, natural language understanding, and robotic vision. Traditional approaches have failed due to the extreme complexity of the algorithms needed, making software development and maintenance costs unacceptably high. In addition, processing requirements for many applications are extremely large, again resulting in unacceptably high costs. Knowledge-based systems have had limited success in a few areas, such as fault diagnosis, but fall short in many of the more difficult cases. Performance and software development costs are also an issue with knowledge-based systems.

One of the reasons that many pattern classification problems are difficult to solve on a computer is that there is a basic incompatibility between the problem and the machine architecture. Modern computer systems rely on quick processors that perform operations sequentially on individual pieces of data, but this method is inappropriate when applied to some problems. For example, when viewing a picture, it is desirable to interpret it as a whole, rather than as a large number of individual picture elements (pixels) that somehow interrelate. But in order to get a sequential processor to interpret a picture, one must devise an algorithm for performing the interpretation by sequential processing of individual pixels. This has proven to be extremely difficult.

Artificial neural networks are a promising new technology that may provide a solution to these problems. Neural networks can treat complex patterns as a whole, thereby circumventing the problems associated with the traditional approach. Moreover, the ability of these networks to discover relationships in the data on their own through a training process lowers system development costs substantially. Although neural networks are able to capitalize on the inherent parallelism present in these problems, most neural network development work is done using simulations of networks on standard, single-CPU computer architectures. This tends to exacerbate the performance issue due to the computationally intensive simulations.

An introductory article describing neural networks is Learner, E. J., "Computers that learn", *Aerospace America*, June 1988, pp. 32 et seq.

There is a growing need for hardware and software systems designed specifically to take advantage of the massive parallelism of neural networks in order to provide sufficient computational power to meet the requirements of future applications. This must be balanced against the requirements that such hardware be cost effective, easy to use, and readily available. The present invention offers an elegant solution to this need.

Due to the universal availability of traditional sequential computer systems, it is not surprising that most neutral network development has been done directly on such machines. This requires that the inherent parallelism of the networks be software simulated, treating the single sequential processor as a virtual parallel system. Unfortunately, even modest neural network applications can overwhelm large computer systems. This is a result of the need to perform massive numbers of floating point multiply/accumulate calculations.

Hosting the simulations on larger, more powerful computers and supercomputers is one approach. However, this is not cost effective in most cases. There are also a growing number of parallel-CPU computer systems on the market which can be used to increase performance. Many of these systems rely on an arrangement such as the hypercube to facilitate communication among the processors in the system. As with the larger supercomputers, the cost of these systems is prohibitive in many cases, and hence, their availability is limited. Additionally, the design of these systems has not been optimized for neural network applications, and they do not come with special purpose software for neural networks.

A dedicated coprocessor system, tailored for neural networks, but housed in a traditional platform such as a desktop microcomputer, is an approach that has been taken by two companies, Hecht-Nielsen Neurocomputer Corporation and Science Applications International Corporation. Both vendors provide coprocessor boards for IBM PC/AT-compatable computers and specialized software for applications development, as evidenced by the specification sheets from these two companies. However, unlike the present invention, neither of these systems is a true parallel processor, and neither system is designed specifically to take advantage of the parallel computations in neural networks.

U.S. Pat. No. 4,414,624 discloses a multiple parallel processor computer system, including a dual bus structure and a combination dedicated/shared memory arrangement. The present invention offers the following advantages over the reference device: (1) means for implementing a neural network on the architecture; (2) means for transferring information from individual processors 10 to the global memory 55,56 using two busses 30,59 simultaneously; (3) means for broadcasting data from the global memory 55, 56 to all of the individual processors 10 simultaneously; (4) when one of the processors 10 sends information to the global memory 55,56, means for monitoring this information by all of the other processors 10 simultaneously, thus speeding computation for the preferred neural network application. In the reference device, on the other hand, when a processor communicates with the shared memory, the other processors do not monitor the information.

Other references are U.S. Pat. Nos. 4,214,305; 4,219,873; 4,253,146; 4,351,025; 4,486,834; 4,591,977; and 4,644,461.

DISCLOSURE OF INVENTION

The present invention is a digital computer particularly tailored for implementing neural networks. Several simultaneously operable processors (10) each have a local memory (17) for storing weight and connectivity information for those nodes of the neural network that will be processed by said processor (10), as defined by software. A global memory (55,56) is coupled to each of the processors (10) via a common data bus (30). Means (31,30,51) allow the efficient broadcasting of data from the global memory (55,56) to each processor (10) simultaneously. Means (30,31,23,26) allow the efficient broadcasting of data from each processor (10) to all of the other processors (10) and to the global memory (55,56) simultaneously.

BRIEF DESCRIPTION OF THE DRAWINGS

These and other more detailed and specific objects and features of the present invention are more fully disclosed in the following specification, reference being had to the accompanying drawings, in which.

BEST MODE FOR CARRYING OUT THE INVENTION

Figure 1:
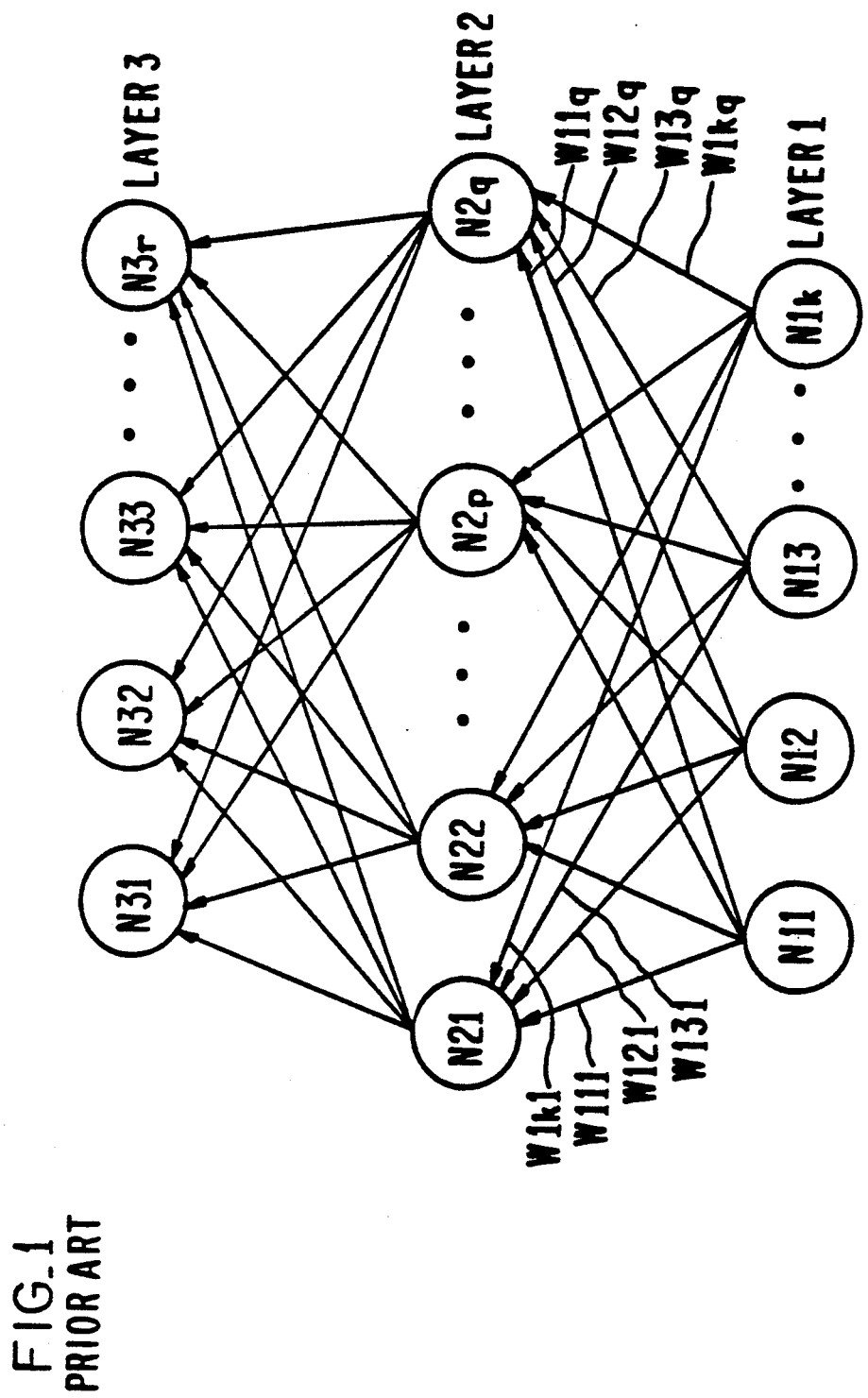
FIG. 1 is a schematic diagram of a neural network such as can be implemented on the hardware architecture described in the present specification and claims.

The preferred embodiment of the present invention is an IBM PC/AT-compatible parallel coprocessor computer system, specifically tailored to neural networks, that is expansible from a minimum 100 MFlops (100 Million Floating point operations per second) to a maximum 1600 MFlops. This architecture allows, and in fact encourages, the development of special purpose software to facilitate neural network applications. This system is capable of performance normally associated with large mainframe and supercomputer systems, but within a desktop computer!

Typical neural networks which can be quickly and advantageously implemented on the instant architecture include the popular back-propagation, counterpropation, adaptive resonance 1 and 2, feature map classifier, neocognitron, and spatio-temporal avalanche.

The required performance is achieved in the present invention at a substantially reduced price/performance ratio. Coupled with appropriate software, this results in reduced development costs for the applications of interest.

The present invention uses digital signal processor integrated circuits, parallel processor design techniques, and neural network software, to provide capabilities that exceed those of any other commercially available neurocomputing system by several orders of magnitude. Instead of a single coprocessor board, our approach, in the preferred embodiment described herein, provides for a two-board 50,60 assembly. The two-board approach allows us to provide a large global memory space 55,56, available to all processors 10 in the system, on one memory board (M-board) 50, and a separate processor board (P-board) 60 having four processors 10 operating in parallel, each with its own local memory 17. This optimizes the computations associated with the networks, since the distinction between global information and local information is well defined in virtually all neural network architectures. Furthermore, the modular design approach allows for easy expansion beyond a single two-board system to achieve the objective of an aggregate computing power of approximately 1600 MFlops.

The local memory block 17 of 1 Megaword × 32 bits on each DSP 10 stores local information (weights and connectivities) needed only by the nodes being calculated by that DSP 10.

The separate, global memory 55,56 is accessible in parallel by all DSP's 10 in the system, regardless of the number of P-boards 60.

The baseline P-board 60 has a processing capability of 100 MFlops. The M-board 50, shown in FIG. 4, communicates with the P-board 60, shown in FIG. 3, through a ribbon cable 30 connected between sockets at the top center of each board 50,60. The four processors 10 on the P-board 60 perform their calculations in parallel using a combination of data stored locally at DRAM's 17 and data retrieved from the common memory 55,56 on the M-board 50. The P-board 60/M-board 50 set is integrated into the host PC/AT machine 40 by mapping the M-board global memory 55,56 into the memory space of the host 40.

The system is extensible through the addition of up to 15 additional P-boards 60 with four DSP's 10 on each, and/or the addition of up to three additional M-boards 50, each with 4M × 32 bits of memory 55,56 in the current embodiment, with provisions for 16M × 32 bits when 4M-bit DRAM technology becomes available.

We chose the Texas Instruments 320C30 digital signal processor (DSP) for our processors 10. This chip offers many advantages over other choices:

Parallel floating point multiply/accumulate units 14,15 on board the chip 10 allow this critical network computation to occur at the full clock speed (up to 33 MHz, or 33 MFlops in the preferred embodiment).

Two 1 Kiloword blocks of RAM 20,21 on board the chip, and an on-chip direct memory access (DMA) controller 16 allow external memory 17 access without interrupting ongoing calculations of the CPU 11.

Twin, 32-bit external data busses 19 and 30, simultaneously accessible, permit concurrent access to both local 17 and global memory 55,56. Thus, the DSP processors 10 are optimized for performing sum-of-products calculations in parallel with data fetches from memory 17.

Software to accompany this system has been designed to take full advantage of the parallelism afforded by the hardware. A common user interface allows users easy access to any neural network architecture. The neural network software was designed so that each processor 10 in the system performs calculations for a fraction of the nodes on each layer of the network. Thus, performance is enhanced linearly by the number of DSP processors 10 working in parallel. The baseline P-board 60 incorporates four DSP chips 10 operating in parallel, to speed computations on a layer of the neural network. This means that, in a single P-board 60 system, for example, each DSP 10 calculates one fourth of the output values for a given layer.

The system is optimized for processing large pattern classifications and other neural network applications of interest to science, but the architecture does not preclude the use of the computer as a standard parallel computer. It is ideally suited for some non-neural network applications such as FFT's (fast Fourier transforms). Moreover, the hardware interface between the boards 50,60 and the PC/AT host 40 is only a small part of the design. This means that the basic architecture can be readily adapted to other host computers 40. This permits developers to transfer the design to other host systems, or to design applications on the PC/AT based computer 40, then port the design to boards such as 50,60 embedded in other systems. This significantly reduces development costs.

The user interface software provides functions that allow the user to select a network architecture and its parameters, upload training or production data to the neural network multiprocessor, display relevant data, evaluate network performance, read and write data files, and perform other non-architecture specific functions.

For purposes of the present specification and claims, a neural network is defined as a process comprising a series of ordered steps where each step corresponds to the execution of a layer. Each layer comprises a plurality of nodes. Each node performs a calculation of an output value based upon connections of that node to a subset (which can be an exhaustive subset) of nodes from the immediately preceding (lower-ordered) layer. In each case, the output value of a node is some function of the sum, taken across all of the nodes to which the node in question is connected, of the output value of each node modulated by a weight that is unique to that internodal connection. The output value of each node is sent to a subset (which may be an exhaustive subset) of the nodes on the immediately subsequent (higher-level) layer.

Layers in neural networks are most often fully interconnected. This means that all of the nodes from one layer are connected to all of the nodes on the next layer. In this situation, both global and local information can, for the most part, be represented as sequential arrays in memory 55,56,17 requiring the least overhead to process.

A neural network is a dynamic process in that the network adapts by changing its own weights based upon what the network has learned. The learning is accomplished during a training phase and possibly even during a production run.

Turning to FIG. 1, we see an example of a neural network which may fruitfully be implemented on the present invention. For purposes of illustration only, the depicted neural network has three layers.

In an actual neural network, the number of layers is arbitrary and may be anything from two up to a very high integral number. Layer 1 (the lowest-ordered layer) is the layer that is executed first. It is seen to have k nodes, where k is an arbitrary integer, numbered from N11 to N1k, respectively. After the output values of the nodes of the first layer have all been calculated (alternatively, the output values from the first layer may be considered to be the initial condition), layer 2 is executed. Layer 2 is seen to have q nodes, where q is an arbitrary integer, numbered N21 through N2q, respectively. The vectors in FIG. 1 illustrate internodal connections. It is seen that node N21 is connected to all of the nodes of the first layer, i.e., it is "fully connected" to the first layer. This doesn't have to be the case; N21 could be partially connected to the first layer.

The output value of a node equals $$fA \sum_{j=0}^{N} fB(out_j, W_{ij})$$

where fA is some function, called the activation function; the summation is taken across all of the other N nodes to which the node is question is connected; and fB is any function of the output value ("out") from each said other node and a weight (i.e., a scalar) associated with that internodal connection.

Thus, for node N21, for example, its output value is some function of the sum of the following quantity: a function of W111 and the output value of N11, plus a function of W121 and the output value of N12, plus a function of W131 and the output value of N13, ... plus a function of Wlk1 and the output value of N1k.

Similarly, the output value of node N2q is some function of the sum of the following quantity: a function of W11q and the output value of N11, plus a function of W12q and the output value of N12, plus a function of W13q and the output value of N13, ... plus a function of W1kq and the output value of N1k.

The output values from layer 2 are fed, based upon the connectivities illustrated by means of vectors in FIG. 1, to the indicated nodes within layer 3. The output values of the nodes of layer 3 are then calculated. This process is then repeated for all the remaining layers in the neural network, if there are more than the illustrated three layers. The set of output values from the highest-level layer is considered to be the output of the neural network.

Figure 2:
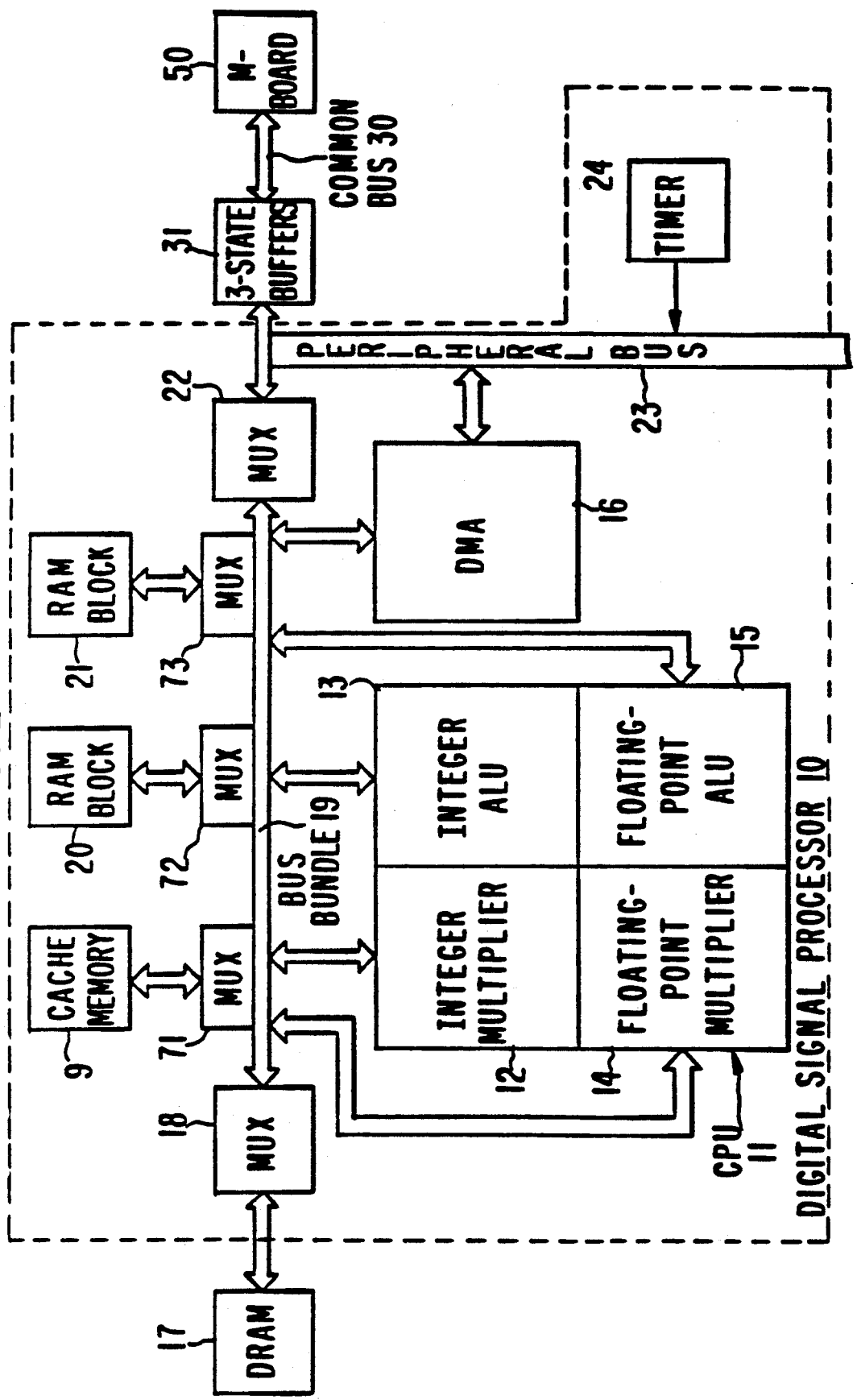
FIG. 2 is a block diagram indicating the architecture of each digital signal processor (DSP) 10 of the present invention.

The computer of the present invention comprises a plurality of substantially identical digital signal processors (DSP's) 10. The architecture of each DSP 10 is illustrated in FIG. 2. The heart of each DSP 10 is central processing unit (CPU) 11, which comprises an integer multiplier 12, an integer arithmetic logic unit (ALU) 13, a floating point multiplier 14, and a floating point ALU 15. In the preferred embodiment illustrated herein, which has been built, each DSP 10 is a 320C30 digital signal processing chip manufactured by Texas Instruments.

DSP 10 further comprises direct memory access (DMA) controller 16. Each one of components 12 through 16 can be communicating outside itself simultaneously, enhancing the parallelism of the system, because each one of these components is allocated one out of the five busses collectively referred to as bus bundle 19. Each of the five busses has 32 data lines plus address lines. DSP 10 further comprises two groupings of random access memory (RAM), designated RAM block 20 and RAM block 21, each of which communicates with bus bundle 19 over a unidirectional address bus and a bidirectional data bus. Only the data bus is shown, for purposes of simplicity. Multiplexers 71, 72, and 73 determine which of the five busses from bus bundle 19 will be given access to memories 9, 20, and 21, respectively. In the TI 320C30 chip, each of RAM block 20 and RAM block 21 comprises one Kiloword, with each word having 32 bits.

Each DSP 10 further comprises a cache memory 9, which also communicates with bus bundle 19 over 32 data lines. In the TI 320C30 chip, cache memory 9 has 64 32-bit words. Cache memory 9 increases the throughput of the system by minimizing the required accesses to dynamic random access memory (DRAM) 17. DRAM 17 is considered the "local memory" of DSP 10. In DRAM 17 are stored all of the weights and connectivities for all the nodes for which calculations will be performed by that DSP 10. The identities of said nodes are defined by the software. DRAM 17 is connected to bus bundle 19 via multiplexer 18, whose function is to select which of the five busses of bus bundle 19 is to be connected to DRAM 17. The link between DRAM 17 and mux 18 comprises a bidirectional data bus and a unidirectional address bus. As before, only the former is shown in FIG. 2 to avoid cluttering the drawing.

A pipeline controller (not illustrated allows for a large degree of parallelism within DSP 10. The pipeline controller allows for simultaneous decode, opcode fetch, execution, and contention resolution. As a result of this parallelism, for each of memories 9, 20, and 21, two reads or a read and a write can be performed within the same clock 53 cycle. And all of this can occur simultaneously with a read or a write to DRAM 17 by DMA controller 16. The components accessing memories 9, 20, and 21 are components 12-16. Accesses to global memory 55,56 are controlled by DMA controller 16, which generates strokes for regulating all data transfers external to DSP 10 across the common bus 30.

Bus bundle 19 is coupled to the global memory 55,56 on M-board 50 by means of multiplexer 22, buffers 31, and common bus 30. The purpose of multiplexer 22 is to select the bus from bundle 19 that will communicate with M-board 50 Buffers 31 are a set of switches for each of the 32 data bits of bus 30. Buffers 31 are typically three-state buffers, i.e., each line can be switched so that data can be communicated from DSP 10 to M-board 50; so that data can be communicated from M-board 50 to DSP 10 (the default setting; on so that no data can be communicated in either direction.

Peripheral bus 23 is a 32-bit extension of the connection between multiplexer 22 and buffers 31. To bus 23 is connected timer 24, which generates a periodic interrupt to CPU 11 to perform dynamic refresh of DRAM 17. Other connections could be made to peripheral bus 23, such as serial ports and additional timers, but they are not used in the present invention. A 32-bit data connection is made from peripheral bus 23 to DMA controller 16. This connection enables CPU 11 to communicate to control registers within controller 16 such items as where to move data from and to, the number of words to be transferred, whether address registers should be incremented or decremented, and whether controller 16 should issue an interrupt when done with its data transfer.

Figure 3:
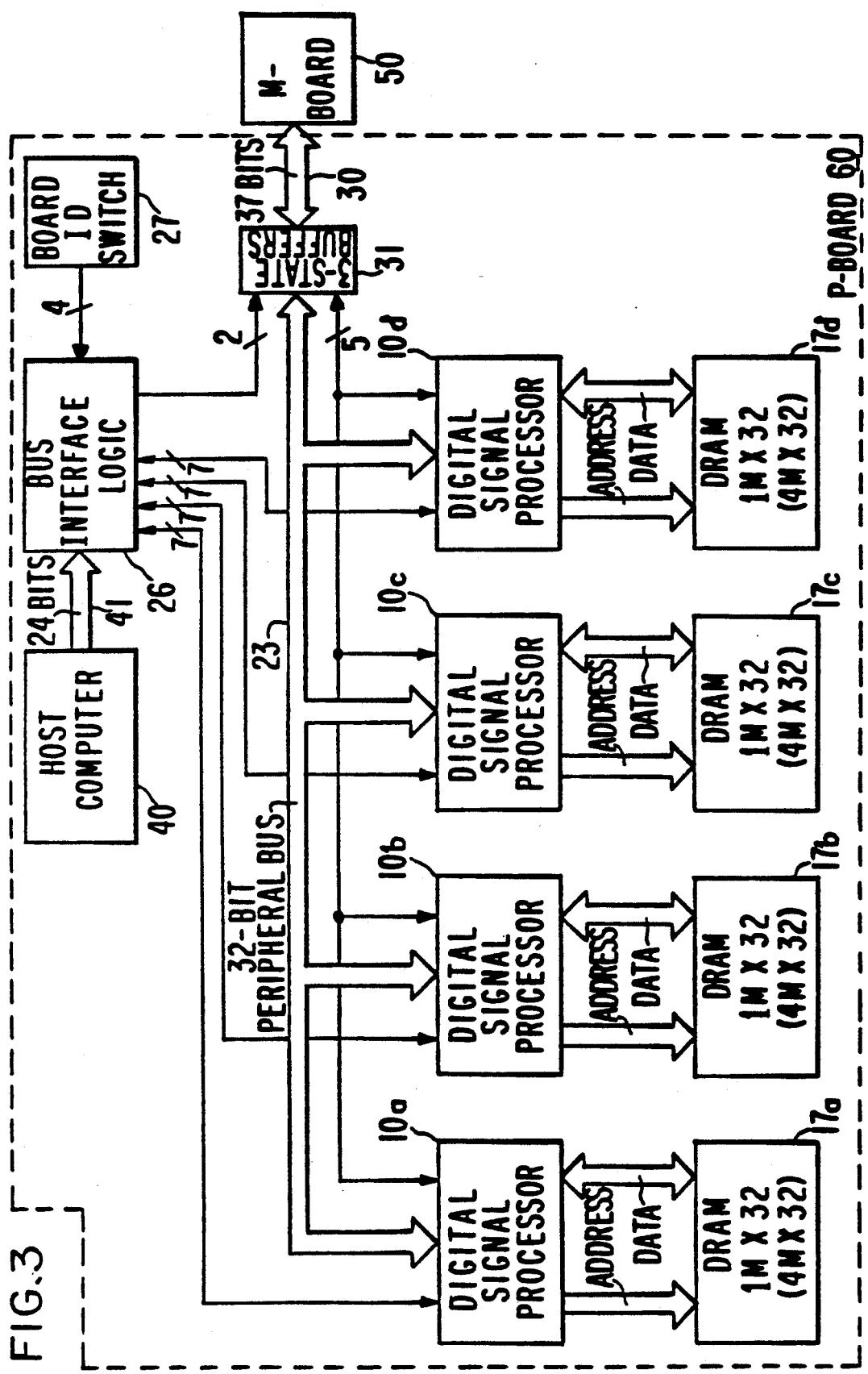
FIG. 3 is a block diagram of a grouping of DSP's 10 onto a single P-Board 60 of the present invention.

FIG. 3 illustrates four DSP's 10a, 10b, 10c, and 10d, respectively, which are grouped together on a single P-board 60. Each DSP 10 has a unique hardware identification. Processors 10 access the information on M-board 50 over common data bus 30. To accomplish this, the software, based on hardware identification of the DSP's 10, designates one DSP 10 as the "system master". There is only one system master, even in the multi-P-board 60 embodiment. The system master 10 initiates the data fetch from M-board 50. Once this process is begun, all DSP's 10 on P-board 50 become "listeners" receiving identical information from M-board 50. This helps to alleviate the bottlenecks usually associated with common memory designs, and effectively improves data throughput.

FIG. 3 shows that each DRAM 17 is connected to its corresponding DSP 10 via two busses, a bidirectional data bus and a unidirectional address bus. Dynamic RAMS 17 were chosen over static RAMS for the present application because of their greater density. In the embodiment that has been built, each DRAM 17 has the capacity of 1 Megaword, with each word being 32 bits. There is room on P-board 60 for DRAM's 17 having the size of 4 Megawords once these DRAM's become commercially available.

Board ID switch 27 is used when there is more than one P-Board 60, i.e, when there are more than four DSP's 10. Switch 27 is a 4-bit switch used to provide hardware identification to the DSP's 10 and to identify via hardware that unique DSP 10 which is the system master. Switch 27 sends its four bits to bus interface logic 26. The function of bus interface logic 26 is to assure that when information goes out to M-board 50, all DSP's 10 are synchronized and monitoring the data transaction across bus 30.

Host computer 40, which in the preferred embodiment is an IBM PC/AT or clone thereof, communicates with bus interface logic 26 over 24-bit address bus 41. This enables host computer 40 to interrupt any one of the DSP's 10. This can be done, for example, to start signal propagation routines or to change weights. Only the interrupt of the DSP 10 is accomplished via P-board 60. Data transfer from host 40 to the DSP's 10 is done solely via M-board 50 for design simplicity.

Logic 26 communicates with each DSP 10 via 7 bits. The arrows on both sides of each of these bit lines in FIG. 3 do not indicate that all of these bit paths are bidirectional, but is merely a shorthand notation to indicate that when the 7 bits are taken together as a whole, there is two-way communication between logic 26 and each DSP 10. The 7 bit lines are defined as follows:

REQUEST SYNCHRONIZATION: Used by a DSP 10 when the DSP 10 wishes to send data to M-board 50. As defined by the software, this normally occurs when the DSP 10 is done processing all the nodes for a layer of the neural network, but could be made to occur after the DSP has processed each node.

ACKNOWLEDGE SYNCHRONIZATION: Generated by logic 26 only when logic 26 has received a REQUEST SYNCHRONIZATION signal from all of the DSP's 10 on the board 60.

READY indicates that synchronization has been established, and now one of the DSP's 10 on the board 60 has been authorized to broadcast data to M-Board 50 and to the other DSP's 10.

Four INTERRUPT lines, used for generating one of four interrupts to a DSP 10 when host computer 40 wishes to communicate with one of the DSP's 10.

Logic 26 sends two bits to 3-state buffers 31. The function of these two bits is to control when and in what direction buffers 31 are enabled. When more than one P-board 60 is used, there is but a single common bus 30, but there is one set of 3-state buffers 31 on each P-board 60. In that case, logic 26 reverses direction (enabling communication in the direction P-board 60 to M-board 50) within buffers 31 only for that P-board 60 which contains the broadcasting DSP 10. This enables all of the other DSPs 10 on all of the other P-boards 60 to receive (via common data bus 30) the information being broadcast. This is a great time-saving feature, because the information being broadcast is output value information, which is precisely the information needed by the DSP's 10 when they begin to perform calculations for the next layer of the neural network. This information is fed into RAM blocks 20 of each DSP 10 in much the same manner output value information (or, in the case of the lowest-level layer, initializing information) is fed into said RAM blocks 20 from global memory 55,56, in a "pipelining" process. That is to say, a first portion of the output values is fed into RAM block 20 of each DSP 10 in a first step. In a second step, additional portions of the output values are fed from global memory 55, 56 to RAM block 21 within each DSP 10, while, simultaneously, CPU 11 accesses RAM block 21 to process the first portion of output values.

When there is but one P-board 60 (or, in the case of multiple P-boards 60, within a P-board), the "eavesdropping" by DSP's 10 of information sent by the broadcasting DSP 10 is made possible by the fact that all of the DSP's 10 on the board 60 are coupled together by peripheral bus 23.

Five bit lines are used to communicate between buffers 31 and each DSP 10. As before, the arrows on each end of these bit lines in FIG. 3 do not indicate that each bit line is bidirectional, but rather that, when taken as a whole, there is bidirectional communication between each DSP 10 and buffers 31. These 5 signals are denominated RESET, CLOCK, READY, READ, and WRITE. These five bits are carried across buffers 31 and become part of common bus 30, which thus has 37 bits, 32 data bits and these five control bits. These control bits are defined as follows:

RESET: enables host computer 40 to reset all the processors 10, 52 on both the P-Board 60 and M-Board 50. Processors 10, 52 also reset automatically at power-up.

CLOCK: an osciallator signal sent from the system clock 53 on M-Board 50 to P-Board 60 to keep all of the digital components synchronized.

READY: the logical inverse of the READY described above from logic 26 to the DSP's 10. READY, a handshaking function, goes high only when all the DSP's 10 are ready to perform a data transaction on the common bus 30. This insures that all DSP's 10 receive the same data from one of the other DSP's 10 or from M-Board 50.

READ and WRITE: used to generate interrupts to M-Board 50. Specifically, READ and WRITE switch data bridge 51 in the proper direction. Within a P-board 60, READ and WRITE are originated by that DSP 10 that is doing the reading or writing. When these signals are sent over the common bus 30, READ and WRITE are generated by that DSP 10 that has been designated the system master.

Figure 4:
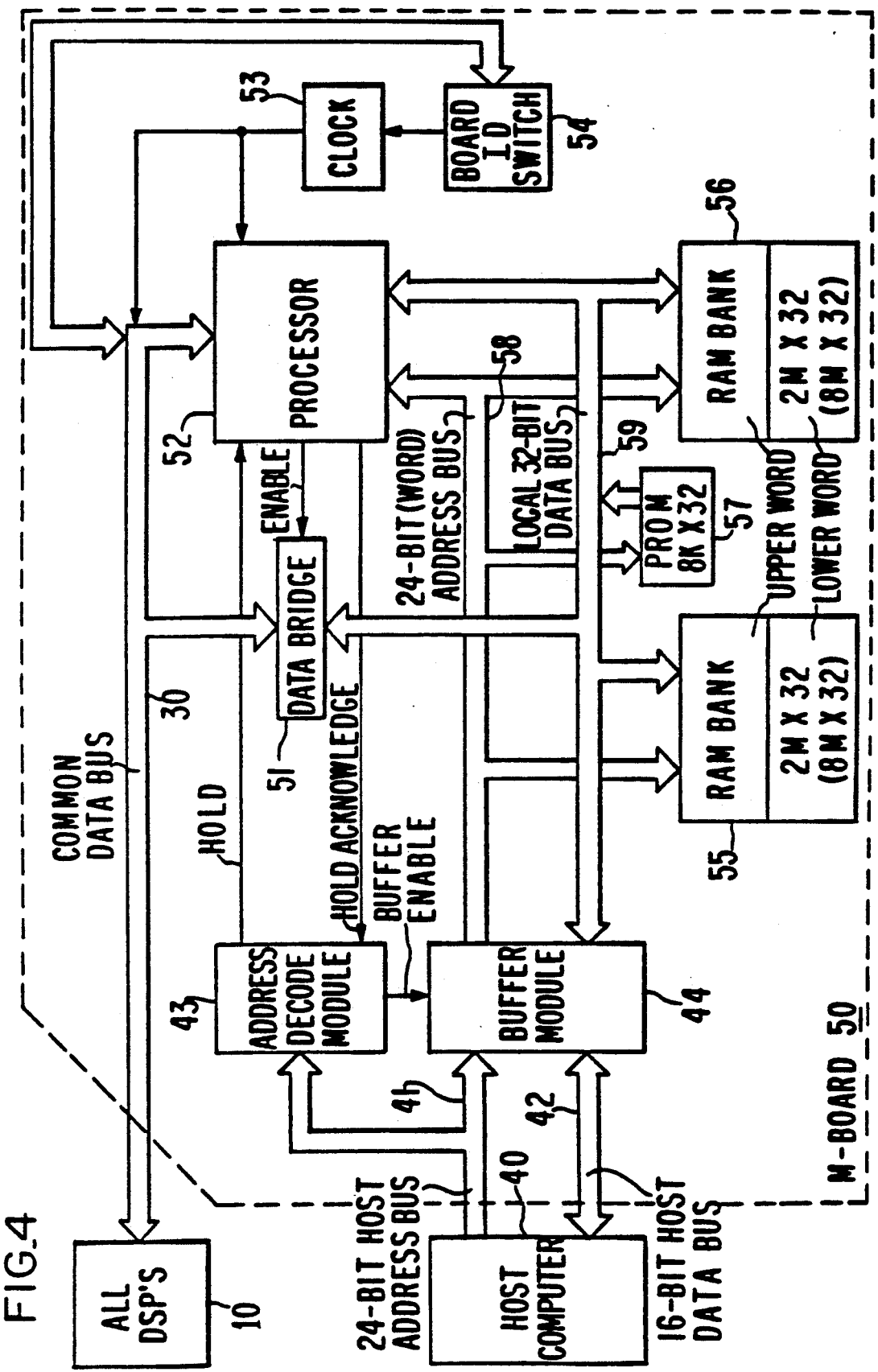
FIG. 4 is a block diagram of a preferred embodiment of M-Board 50 of the present invention.

FIG. 4 illustrates the architecture on M-Board 50. The heart of M-Board 50 is the global memory, consisting of RAM bank 55 and RAM bank 56. In the preferred embodiment, the global memory has been split into two pieces this way in order to comply with addressing conventions. Each RAM bank 55, 56 has a two Megaword capacity, with each word being 32 bits. The design of the chips is such that each word is divided into an upper word having 16 bits and a lower word having 16 bits. The design of the M-board 50 is such that existing RAM banks 55, 56 can be upgraded to 8 Megaword capacity when 4 Mbit DRAM technology becomes commercially available.

RAM banks 55, 56 communicate with the rest of the hardware via a 24-bit word-oriented address bus 58 and a bidirectional local 32-bit data bus 59. Also connected to these two busses 58, 59 is a programmable read only memory (PROM) 57, 8 Kilowords in the preferred embodiment, which performs diagnostics and initializes the hardware, e.g., starts the refresh of DRAM's 17.

Host computer 40 communicates with M-Board 50 via a unidirectional host address bus 41, which, although it has 24 bits, is byte-oriented rather than word-oriented as is bus 58; and by bidirectional host data bus 42. Host computer 40 places the input values of the neural network into RAM banks 55, 56. It also can be used to receive and display intermediate results, and receives the outputs from the neural network, via RAM banks 55 and 56.

Host computer 40 accesses RAM banks 55, 56 via address decode module 43, which determines when the host computer 40 selects the M-Board memory from the 24 address bits on bus 41, and generates a HOLD signal, which is sent to processor 52. In response to the HOLD signal, processor 52 generates a HOLD ACKNOWLEDGE signal, which causes address decode module 43 to generate a BUFFER ENABLE signal, which is sent to buffer module 44. Address decode module 43 also performs a mapping to translate the byte orientation of the host computer 40 to the word orientation of all of the DSP's 10, 52. Buffer module 44 contains means for multiplexing the 32 bit lines of bus 59 onto the 16 bit lines of bus 42.

Processor 52 is used to select the proper address from within RAM banks 55, 56 when one of the DSP's 10 wishes to access global memory 55, 56. In the preferred embodiment, a TI320C30 was selected for processor 52 to maintain compatability, particularly speed compatability, with DSP's 10. Processor 52 also refreshes the memory in the two RAM banks 55, 56. When M-board 50 communicates with the DSP's 10, no addresses need be specified for the DSP's 10, because this is the mode where global memory is broadcasting to all of the DSP's 10 simultaneously.

Data bridge 51 is a set of bus transceivers (e.g., 3-state buffers) used to shortcut the data path between the DSP's 10 and RAM banks 55, 56. Data bridge 51 enables any and all data to be passed directly between DSP's 10 and RAM banks 55, 56 without having to first pass through processor 52. Data bridge 51, enabled by processor board 52, allows common data bus 30 and local data bus 59 to be active simultaneously, increasing the throughput.

Because of the operation of data bridge 51, in the embodiment that has been built, the extension of bus 59 from memories 55, 56 to processor 52 is not used. However, this hardware is in place for possible future use. For example, in an elemental one-processor system, there would be no P-board 60 at all; rather, processor 52 would perform all of the nodal calculations. Alternatively, said extension could be activated if memory were expanded or if it were desired to have processor 52 perform calulations on data within memories 55, 56.

Board ID switch 54 is used when there is more than one M-board 50. Although the preferred embodiment has one M-board 50, the system as presently designed is extensible to up to four M-Boards 50, all of which can fit within the chassis of an IBM PC/AT. When used, switch 54 communicates the hardware identification of the M-board 50 to system clock 53, which controls the timing of all of the components on all of the boards 50, 60. Only the clock 53 on the single M-board 50 having an ID of zero is activated. Switch 54 also enables four bits out of the 32 data bits to transmit the M-board 50 ID code to the M-board processor 52 over bus 30.

In the present embodiment, clock 53 runs at 25 MHz. When DRAM's 17 allowing a speed of 33 MHz become commercially available, the speed of clock 53 will be stepped up to 33 MHz, to match the maximum speed of DSP's 10. It is seen from FIG. 4 that clock 53 has direct lines to processor 52 and common data bus 30.

The operation of the system in calculating output values for a neural network will now be illustrated using the configuration where there are four DSP's 10. Initially, connection and weight information for one fourth of the nodes on the network has been stored in each of the four DRAM's 17. For a network layer not divisible evenly by four, one or more DSP's 10 will have fewer connections to process than that DSP (or DSP's 10) calculating for the highest number of nodes. The "system master" DSP 10 initiates a 1024 word fetch of global input data from M-board 50. These data are stored by each DSP 10 in its respective internal RAM block 20. Once the transfer is complete, each CPU 11 begins the sum-of-products calculation necessary to calculate the output value for the first node to which that DSP 10 has been assigned, using the input data stored in RAM block 20 and the connection and weight information stored in its local external memory 17.

While CPU 11 is processing the first 1K of input data by means of accessing RAM block 20, DMA controller 16 simultaneously begins another 1 KW fetch of data from global memory 55,56. This time, the data are stored in internal RAM block 21. By the time CPU 11 has completed its processing using the information in RAM block 20, the second 1 KW is available for processing in RAM block 21. This "pipeline" continues until the entire sum-of-products calculation necessary to calculate output values for all nodes allocated to the particular DSP 10 has been completed. The DSP's 10 then perform any other required operation on the result to convert it to the output value, which is temporarily stored in DRAM 17.

Finally, each DSP 10 in sequence broadcasts a multiword transfer back to the global memory 55,56 in order to store the computed output values. This information is simultaneously monitored by all the other DSP's 10 in the system, and is fed into their RAM blocks 20 in order to give them a head start in processing the next layer of the network (or the next set of four nodes within the same layer, depending upon how the software has been configured), thus increasing the throughput of the system.

Now global memory 55, 56 broadcasts a second portion of the output values to RAM block 21 of each DSP 10, while each CPU 11 works on the portion in RAM block 20. This pipeline is continued, alternatively using RAM blocks 20 and 21, until all of the output value information has been broadcast to the DSP's 10. Then DSP's 10 broadcast the output values from the nodes of the new layer as before. When the output values from the highest-ordered layer of the neural network have been sent to global memory 55, 56, these values become the output of the neural network, and are fed by memory 55, 56 to host computer 40, where they may be displayed or otherwise used.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A method for implementing a neural network on a digital computer, wherein the neural network comprises a plurality of nodes organized into at least two ordered layers, with each node not on the lowest-ordered layer performing a calculation modulating an output by a weighting value from each of a subset of nodes from the immediately lower-ordered layer to which said node is connected, the result of said calculation being referred to as an output value; and the digital computer comprises several substantially identical parallel processing elements each coupled to a global memory, whereby the global memory is located on a memory board separate from a processing board containing the processing elements.

said method comprising the steps of:
A. broadcasting from the global memory into a first local memory block of each of the processing elements first layer output values from a first layer of the neural network.
B. causing said processing elements to calculate second layer output values for a set of nodes from a second layer immediately higher-ordered than said first layer, based on values of weights (stored by said processing elements) associated with connectivities between said nodes on said second layer and nodes on said first layer;
C. broadcasting, from each processing element, said second layer output values to the global memory;
D. each processing element substantially simultaneously monitoring the second output values of broadcasting Step C and storing said values in a local memory block; wherein
E. for every layer j except for the first layer, output values from the (j-1)st layer are broadcast from the global memory to a first local memory block of each of the processing elements;
F. the processing elements calculate output values for the jth layer based on stored weights associated wth connectivities between nodes of the jth layer and nodes of the (j-1)st layer and further based on the output values stored in the first local memory block;
G. substantially simultaneously with calculating Step F, additional output values from the (j-1)st layer are broadcast from the global memory into a second local memory block of each of the processing elements;
H. the processing elements then calculate additional output values for the jth layer, based on stored weights associated with connectivities between nodes of the jth layer and nodes of the (j-1)st layer and further based on the output values stored in the second local memory block;
I. each processing element broadcasts, to the global memory and to all the other processing elements, output values of nodes for the jth layer for which said processing element has performed calculations; and
J. each processing element substantially simultaneously monitors the output values of Step I and stores the output values in a local memory block.

2. A method for implementing a neural network on a digital computer, wherein the neural network comprises a plurality of nodes organized into at least two ordered layers, with each node not on the lowest-ordered layer performing a calculation modulating an output by a weighting value from each of a subset of nodes from the immediately lower-ordered layer to which said node is connected, the result of said calculation being referred to as an output value; and the digital computer comprises several substantially identical parallel processing elements each coupled to a global memory, whereby the global memory is located on a memory board separate from a processing board containing the processing elements: said method comprising the steps of:

A. broadcasting from the global memory into a first local memory block of each of the processing elements first layer output values from a first layer of the neural network;

B. causing said processing elements to calculate second layer output values for a set of nodes from a second layer immediately higher-ordered than said first layer, based on values of weights (stored by said processing elements) associated with connectivities between said nodes on said second layer and nodes on said first layer;

C. broadcasting, from each processing element, said second layer output values to the global memory;

D. each processing element substantially simultaneously monitoring the second output values of broadcasting Step C and storing said values in a local memory block;

wherein the output values that are broadcast from the global memory to the processing elements are sufficiently voluminous that said output values cannot be processed by the processing elements in one step;

in a first substep of the first broadcasting step, a first portion of said output values is fed into a first working memory within each processing element; and in a second substep of the first broadcasting step, additional portions of said output values are fed into a second working memory within each processing element, while the processing element simultaneously performs calculations on said first portion of said output values.

* * * * *